United States Patent
Dallwig

(10) Patent No.: US 12,286,763 B2
(45) Date of Patent: Apr. 29, 2025

(54) METHOD AND APPARATUS FOR LAYER-BY-LAYER FILLING AND COMPACTING COHESIVE BUILDING MATERIALS IN LAYERS IN BOREHOLES

(71) Applicant: JAMMY LIFE GMBH, Berlin (DE)

(72) Inventor: Rainer Dallwig, Potsdam (DE)

(73) Assignee: JAMMY LIFE GMBH, Berlin (DE)

( * ) Notice: Subject to any disclaimer, the term of this patent is extended or adjusted under 35 U.S.C. 154(b) by 207 days.

(21) Appl. No.: 17/780,978

(22) PCT Filed: Nov. 26, 2020

(86) PCT No.: PCT/EP2020/083491
§ 371 (c)(1),
(2) Date: May 28, 2022

(87) PCT Pub. No.: WO2021/105276
PCT Pub. Date: Jun. 3, 2021

(65) Prior Publication Data
US 2022/0412034 A1 Dec. 29, 2022

(30) Foreign Application Priority Data

| Nov. 29, 2019 | (DE) | 20 2019 004 885.5 |
| Jun. 29, 2020 | (DE) | 20 2020 002 792.8 |
| Oct. 6, 2020 | (DE) | 10 2020 212 614.3 |

(51) Int. Cl.
*E02D 3/08* (2006.01)
*C04B 24/26* (2006.01)
*C04B 28/00* (2006.01)
*E02D 3/068* (2006.01)

(52) U.S. Cl.
CPC ............ *E02D 3/08* (2013.01); *C04B 24/2641* (2013.01); *C04B 28/001* (2013.01); *E02D 3/068* (2013.01)

(58) Field of Classification Search
CPC .. E02D 3/02; E02D 3/08; E02D 3/046; E02D 7/06; E02D 7/14
See application file for complete search history.

(56) References Cited

U.S. PATENT DOCUMENTS

| 4,397,588 | A | * | 8/1983 | Goughnour | ............. E02D 27/26 405/232 |
| 4,832,535 | A | * | 5/1989 | Crambes | ................... E02D 5/80 405/262 |

(Continued)

FOREIGN PATENT DOCUMENTS

| CN | 103627136 A | 3/2014 |
| CN | 110206026 A | 9/2019 |
| EP | 1229172 A1 | 4/2004 |

OTHER PUBLICATIONS

CN Office Action dated Feb. 27, 2024 as received in Application No. 202080081986.3.

*Primary Examiner* — Frederick L Lagman
(74) *Attorney, Agent, or Firm* — Maschoff Brennan

(57) ABSTRACT

A method is used for the layer-by-layer filling and compaction of cohesive building materials, in particular of cohesive earth building materials, in at least one borehole near the surface. The cohesive building material is introduced into the at least one borehole and is compacted layer-by-layer using a conveying device comprising a stuffing piston driven by means of a push chain drive.

13 Claims, 5 Drawing Sheets

(56) References Cited

U.S. PATENT DOCUMENTS

| | | | | |
|---|---|---|---|---|
| 5,249,892 | A * | 10/1993 | Fox | E02D 3/054 |
| | | | | 405/271 |
| 6,354,766 | B1 * | 3/2002 | Fox | E21B 7/005 |
| | | | | 405/238 |
| 7,488,139 | B2 * | 2/2009 | Wissmann | E02D 3/08 |
| | | | | 405/271 |
| 8,152,415 | B2 * | 4/2012 | Fox | E02D 5/44 |
| | | | | 405/255 |
| 9,915,050 | B2 * | 3/2018 | Maher | E02D 3/08 |
| 9,915,051 | B2 * | 3/2018 | Niroumand | E02D 27/26 |
| 10,640,944 | B2 * | 5/2020 | Thomas | E02D 5/36 |
| 2004/0115011 | A1 | 6/2004 | Fox | |
| 2014/0126960 | A1 * | 5/2014 | Green | E02B 11/005 |
| | | | | 405/36 |
| 2019/0032296 | A1 * | 1/2019 | Thomas | E02D 7/06 |
| 2022/0380995 | A1 * | 12/2022 | Heichel | E02D 3/054 |

* cited by examiner

METHOD AND APPARATUS FOR LAYER-BY-LAYER FILLING AND COMPACTING COHESIVE BUILDING MATERIALS IN LAYERS IN BOREHOLES

CROSS-REFERENCE TO A RELATED APPLICATION

This application is a National Phase Patent Application of International Patent Application Number PCT/EP2020/083491, filed on Nov. 26, 2020, which claims priority of German Utility Model Application Number 20 2019 004 885.5, filed on Nov. 29, 2019, of German Utility Model Application Number 20 2020 002 792.8, filed on Jun. 29, 2020 and of German Patent Application Number 10 2020 212 614.3, filed on October 2020.

BACKGROUND

The disclosure relates to a method and a device for the layer-by-layer backfilling and compaction of cohesive building materials, in particular of cohesive earth building materials, in at least one borehole near the surface and deeper earth horizons, and to the cohesive building material used therefor.

Near-surface drilling, e.g. in the fields of water and well construction, explosive ordnance detection, geothermal energy, measuring point construction, landfill protection, dyke rehabilitation, etc., is carried out in the hundreds of thousands every year. Drillings are necessary, for example, to explore the building ground, to pump water, to install geothermal heating systems, to locate explosive ordnance, to qualify raw materials, and much more.

In the exploration for explosive ordnance, areas that are subsequently intended for use, e.g. for transport infrastructure, are drilled over a large area. Drillings with a diameter of 100-120 mm and a depth of 6-8 m are common. Some of the drillings are carried out as point soundings (a few drillings per suspected site), others as large-scale soundings in a grid of 0.5-1.7 m. A large part of the areas drilled in this way will be built over with roads and railway lines after identification that it is free of explosive ordnance. Therefore, special requirements are placed on the backfilling of the boreholes.

Every borehole disturbs the ground. However, the ground is disturbed even more by the backfilling than by the actual drilling. Settlement, erosion, shrinkage, material shrinkage in the area of the backfill and thus instability of the drilled and backfilled building ground regularly occur.

The boreholes must always be professionally backfilled. Legal regulations and technical codes of practice apply here, such as DVGW regulation 120; DIN 4904:2017 poured sealing stone in well construction; DIN 4905:2019 hydraulically hardening suspensions.

The technical requirements for borehole backfilling vary from industry to industry and they depend on the type of further use of the drilled site.

In principle, bored natural sealing horizons must be backfilled with natural hydraulic barriers in order to exclude a hydraulic short circuit between potentially contaminated surface water and pure groundwater. Natural sealing horizons usually consist of a naturally grown clay or loam horizon, also known as a groundwater dam. Regardless of the type and objective of the drilling procedure, a drilled-through groundwater dam must always be hydraulically sealed again.

In order to achieve this hydraulic seal, a fill with pourable swelling clay mouldings or granulates is usually introduced into the borehole as a sealing element. The limits of this type of sealing are on the one hand the installation depth and on the other hand the free fill openings, e.g. the annular spaces or the borehole diameters.

Greater installation depths with simultaneously smaller gap openings are usually achieved by suspensions of hydraulically hardening, mostly cement-bound building materials, which are mixed into a suspension and injected by pumps and hoses inserted into the borehole.

In some industries or areas of application, the described procedures do not prove to be ideal. In particular, if the intention is to use the drilled area after borehole plugging for technical infrastructure in which special loads (horizontal, axial, dynamic) are to occur, a rigid cement column or initially loose clay fill becomes risks for the technical infrastructure.

Especially in the area of transport infrastructure, e.g. in the area of roads, motorways, railways or dykes, it is required that the borehole seal is designed in such a way that it quickly absorbs the load and behaves quickly in terms of soil dynamics in the same way as the drilled surrounding rock.

Near surface boreholes are predominantly backfilled by pouring suitable soil construction materials (mostly dry-poured swelling clays) or compressing cement-bound suspensions.

Pouring swellable sealing stone as described in DIN 4904:2017 is the most widely used standard method for backfilling near-surface boreholes. The backfilling is relatively inexpensive, can be carried out without special mechanical effort and is ecologically harmless to the greatest possible extent. However, due to the borehole geometry and condition, bridging regularly occurs when the swelling clay bodies are poured, so that larger air-filled cavities form in the underground backfill body. These cavities are the cause of subsequent settlements not only within the packings but also in the ground as a whole. If these settlements lead to even minimal deformations in the area of the dynamically loaded transport infrastructure, extensive consequential damage can occur, in the course of which route closures and extensive route rehabilitation become necessary.

Compressing the boreholes with cement-bound suspensions (called "dammer" in technical usage), compressing is also called "plugging" in technical usage, creates mostly rigid cement columns as sealing elements in the borehole. These rigid columns are welcome if the ground is to be used after drilling and backfilling, e.g. as building ground and foundation in civil engineering. The rigid cement columns stabilise the subsoil—in addition to a pile foundation, for example. In the area of dynamically loaded traffic infrastructure, however, rigid columns are a potential danger to traffic safety. In traffic facilities, railway tracks, foundation areas of bridges, motorways and waterways drilled in a tight grid, rigid columns lead to undesirable and dangerous vibration, upsurging vibration and resonance. As a consequence of the resonance imaginable under dynamic loading, damage to the track bed or segregation of homogeneous soil structures is conceivable and must be avoided at all costs. In addition, any compressing of liquid construction materials leaves behind so-called settling funnels at the top of the ground. These settlements after liquid backfilling are usually so deep that the upper area of 50-100 cm has to be backfilled again after the suspension has hardened, which entails a great deal of additional work.

A not very common form of borehole filling is the plugging of clay cartridges into the borehole. Swelling clay granules are filled dry into cardboard tubes, which are fitted with caps and coupling pieces at the ends. These cartridges are pushed into boreholes, one after the other, and the surrounding moisture gradually penetrates the clay body and causes it to swell. This product, which originates from blasting technology, is only occasionally used in drilling technology because the borehole can only be completely filled in exceptional cases. If a cardboard cartridge gets jammed in the borehole, readjustment is hardly possible and an air-filled cavity in the horizon below is hardly avoidable.

Backfilling of excavated material was very common for a long time, but today it is reaching the limits of permissibility. In many tenders and technical procedural instructions, "layer-by-layer compaction" is required when backfilling excavated material. This layer-by-layer compaction would restore the original undisturbed condition, but there is a lack of a technique to compact soil in the borehole. The solution disclosed herein is a new technique that can be used to produce the requirement of layer-by-layer compaction in the borehole.

Filling in liquid soil is a conceivable form of borehole backfilling. However, liquid soil regularly leads to erosion damage in the borehole, which destabilises the soil structure.

The approaches known so far thus have a number of disadvantages. This applies in particular to boreholes drilled in the immediate vicinity of transport infrastructure, because aerial bombs, especially from World War II, primarily hit the transport infrastructure.

Firstly, there is a lack of homogeneity in the sealing element, predominantly due to the frequent bridging of the poured sealing material. This inhomogeneity disturbs the building ground, causing settlement or slippage of the traffic body.

Secondly, cementitious compression mass lead to rigid cement columns that contribute to resonance in the transport infrastructure structure due to the build-up of vibration.

Thirdly, compacted installation of cohesive building material in boreholes is—so far—not technically possible or feasible from a construction site perspective. The compaction of cohesive earthworks material in layers is common practice in all large-scale structures, e.g. in landfill construction, in the construction of landfill bases, in the construction of landfill covers, in road construction, in the compaction of building ground, etc. The cohesive earth building material is always applied in layers and then compacted on site. Cohesive earth building material is always applied in layers and compacted in layers with construction equipment (roller, vibratory plate, sheepsfoot roller). A layer-by-layer compacted installation in a borehole is not yet possible.

Fourthly, there is a lack of rapid loading capacity after the backfilling process.

SUMMARY

The problem underlying the solution disclosed herein was thus to provide an improved solution for backfilling boreholes that do not lead to disturbance of the building ground.

This object is solved with a method having the features as described herein.

Accordingly, a method is provided for the layer-by-layer filling and compaction of cohesive building materials, in particular of cohesive soil building materials or earth building materials, in at least one borehole near the surface, wherein the cohesive building material is introduced into the at least one borehole and is compacted layer-by-layer using a conveying device comprising a stuffing piston driven by means of a push chain drive.

For the first time, the present method enables the mechanical layer-by-layer compaction of cohesive earth building materials in a borehole and in deeper earth horizons. This is achieved in particular through the use of a specific binder or sealant as a building material in combination with the conveying device or backfilling machine, the operating principle of which is based on a rigid push chain for advancing cohesive masses with simultaneous compaction through a plug provided on the push chain. Although the use of rigid push chains is known, especially in the horizontal and vertical movement of platforms, loads such as pallets, containers, as a drive for retractable windows, etc., the rigid push chain has not yet been described as a drive for pistons and for driving in pipes or boreholes.

The present method of layer-by-layer compaction results in a compact sealing element that is compressed by about ⅓ compared to the usual fill. Within a short time, the sealing element installed in this way develops almost the geotechnical characteristics of clay in the original deposit (density, kf-value). In addition, the occurrence of cavities is reduced.

With this method, boreholes of all kinds can be backfilled and compacted. The boreholes to be backfilled can include boreholes in special civil engineering or exploratory boreholes such as for explosive ordnance detection, building ground exploration, boreholes for scientific purposes, geothermal boreholes, boreholes for the purpose of geological exploration, e.g. in the field of seismic measurements, for building ground, etc.

In one embodiment of the present method, the at least one borehole is lined with a protective tube and the cohesive building material is filled into the protective tube, in particular in portions (quantities). The protective tube thus serves as a filling tube. Such protective tubes are inserted into the borehole, especially in explosive ordnance exploration. The protective tubes usually have a diameter of 40 to 120 cm, preferably 50 to 110 cm, more preferably 60 to 90 cm. The protective tubes are preferably made of thermoplastic materials such as polyethylene (PE) or polyvinyl chloride (PVC). The protective tubes can be in one piece or preferably consist of screwed segments.

In another embodiment of the present method, after a first portion (or predetermined amount) of cohesive material has been introduced into the borehole, the stuffing piston of the conveying device pushes the cohesive material through the protective tube to the bottom of the borehole and compacts the cohesive material by a back and forth movement of the stuffing piston in the borehole. This essentially vertical movement of the stuffing piston is driven by the push chain and adjusted by a control technology of the push chain drive of the conveying device. Thus, a pressure sensor measures the increasing counterpressure at the respective position of the piston during the movement of the piston in the borehole. Depending on the pressure build-up, there is a switchover from "fast travel" to "slow travel=compression". The control technology carries out a stuffing movement of the stuffing piston by suitable back-and-forth movement and in this way compacts the cohesive earth construction material in the borehole.

In another embodiment of the present method, the protective tube is pulled out of the borehole step by step during the filling of the borehole with the cohesive building material, depending on the amount of cohesive building material introduced. The pipe used as a filling pipe is mechanically pulled out of the borehole according to the filling progress;

i.e. the protective pipe is only pulled out of the borehole as far as the amount of cohesive building material fills the borehole; thus the section of the borehole that is not filled with the cohesive building material is supported by the protective pipe. Compaction takes place outside (=below) the fill pipe, i.e. at the deepest point of the borehole.

In a further embodiment of the present method, after compacting the first portion or first quantity of the cohesive building material in the at least one wellbore, the stuffing piston is moved out of the wellbore, a further second portion or second quantity of the cohesive building material is filled into the protective tube in the wellbore, the stuffing piston is reinserted into the protective tube and the further portion of the cohesive building material is compacted by the movement of the stuffing piston.

This process of filling in portions and compacting the cohesive building material in the borehole is repeated until the borehole is completely filled and is flush with the ground surface or ground level.

The portions or quantities of cohesive building material introduced into the borehole by the present method are preferably each the same, so that the compacted layers preferably each have the same thickness. Thus, the cohesive building material can each be introduced into the wellbore in portions or quantities of 5-15 kg, preferably 8-12 kg (for a 130 mm wellbore size). Preferably, after compaction in the borehole, layers each with a thickness between 30 and 80 cm, preferably between 40 and 60 cm, e.g. 50 cm, result. The number of compacted layers varies with the depth of the borehole and may be, for example, between 5 and 20 layers, preferably between 10 and 15 layers, e.g. 12 layers.

As already indicated above, the type of cohesive building material used is also of importance for the present procedure.

For example, the cohesive building material used for filling and compacting boreholes comprises at least one absorbent in the form of a hydrogel and a soil building material capable of compaction.

A soil building material capable of compaction is understood to mean in particular those materials that can be compressed or stuffed for compaction. Preferred soil building materials are swellable clay minerals. Furthermore, excavated soil, excavated drilling material, drilled material or other predominantly mineral soil types can also be used to produce the compactable building material. It is important to mix a) water-storing hydrogel and b) compactable soil building material.

The building material concept consists of two components: a) the water-storing hydrogel powder based on a superabsorber, which is mixed with water to form a water-storing gel, this as a basis for absorbing b) swellable building material granulates or pellets by mixing a) and b).

In one embodiment, the present cohesive building material is preparable from a mixture comprising 50-70 wt %, preferably 60 wt %, of swellable clay mineral, 0.1-0.5 wt %, preferably 0.2 wt %, of a hydrogel and 39.5-39.9 wt %, preferably 39.8 wt %, of water (in each case based on the total amount of building material).

Preferably, the present cohesive building material contains an acrylic-based hydrogel. Thus, the hydrogel is formed from a cross-linked polyacrylate called superabsorber with water, which does not release moisture stored there immediately, but only gradually to the surrounding swellable clay mineral and thus leads to swelling with a delayed effect.

In a particularly preferred embodiment, a copolymer of acrylic acid and acrylate is used as the at least one hydrogel or absorbent. Such acrylic absorbents with particle sizes between 100-1000 μm are also known as superabsorbents, which are able to absorb many times their own weight of polar liquids such as water. Upon absorption of the liquid, the superabsorbent swells and forms a hydrogel.

In another embodiment of the present cohesive building material, the swellable clay mineral is selected from a group comprising bentonite, montmorillonite, kaolinites, smectites, illites, chlorites or mixtures thereof.

Bentonite, named after the Benton Formation, Fort Benton Montana, is a rock that is a mixture of various clay minerals and contains montmorillonite (60-80%) as its most important component, which explains its strong water absorption and swelling capacity. Other accompanying minerals are quartz, mica, feldspar, pyrite or calcite. It is formed by weathering from volcanic ash.

A well-known representative of the clay minerals is montmorillonite, which belongs to the smectide group as a dioctahedral three-layer silicate with a tetrahedral layer-octahedral layer-tetrahedral layer structure and has a high swelling capacity.

Mixed layers can structurally consist of very different alternating layers, e.g. kaolinite/smectite, chlorite/vermiculite, mica/vermiculite or very often alternating layers of illite/smectite or illite/montmorillonite. Thus, more diverse exchange reactions of cations and anions are possible than with pure montmorillonites. Therefore, mixed layers in a combination with other reactive minerals are particularly well suited for the binding of substances in solution in biological systems.

Presently, the swellable clay mineral with a grain size between 1 and 20 mm, preferably between 5 and 18 mm, more preferably between 10 and 16 mm is used.

The present cohesive building material (or sealing material) is preferably produced by mixing the listed ingredients or components on the construction site and shortly before use.

In this process, first a) an almost stab-proof, drip-free hydrogel is prepared from a cross-linked polyacrylate and water and provided and then b) granules of swellable clay minerals are added to the provided hydrogel while mixing, whereby the clay granules are wetted with hydrogel in a largely non-destructive manner.

The cohesive sealing material or building material produced in this way has a firm, crumbly consistency and a moisture content of 15 to 50%.

In this way, the building material can be mixed in an integrated mixing unit, for example in a drum or shaft mixing unit, depending on the recipe and introduced into the filling pipe in portions according to the borehole cross-sections and the borehole depth.

The clay granules are irregularly surrounded by water-filled but solid hydrogel particles. These water-gel particles release the water under pressure, whereby the water enters or diffuses into the swellable clay, which thus swells and becomes a dense, homogeneous clay mass. Thus, after application in the borehole, a solid, both partially elastic and partially plastic sealing mass is created by automatic swelling of the contained swellable clay minerals without further addition of water.

The advantage of the building material or sealing material used in this case is that after its production and insertion into the borehole, the sealing material has similar soil-mechanical characteristics and properties as the surrounding rock or soil after a short time, especially with regard to moisture and density.

The compaction thus serves two purposes: The pressure during compaction causes water to enter the intermediate layers of the clay material in such a way that it swells and regains approximately the density it had before in the open cast mining. In addition, the building material is compacted in layers in the borehole with the method according to the solution.

Due to its favourable soil-mechanical properties, this cohesive building material or sealing material can also be used as an elastoplastic mineral seal in well construction, pipeline construction, for the sealing of gas wells, of repositories and mines and as a moisture barrier in structural sealing.

The conveying device used in the present method for filling and compacting boreholes comprises at least one push chain unit comprising a push chain drive and a stuffing piston driven by means of the push chain drive.

In one embodiment, the at least one stuffing piston is arranged on the push chain of the push chain drive via a link connection. In this case, the push chain has a supporting effect; the stuffing effect is caused by the piston's own weight. The stuffing piston can be made of e.g. stainless steel or suitable metal alloys.

The stuffing piston has a cylindrical shape, whereby the length of the piston is preferably at least twice the borehole diameter; i.e. a shorter piston is preferred for a small borehole diameter, while a longer piston is preferred for a larger borehole diameter. The use of a disc as a stuffing piston is not desirable, as with a disc there is a risk of jamming in the borehole.

The present conveying device may be mounted on a vehicle or construction equipment. For example, the conveying device can be mobile, preferably mounted on an all-terrain vehicle, mounted on a crawler chassis so that it can be moved independently, or mounted on a frame that is moved by construction equipment such as a wheel loader or forklift truck. This allows for different positioning of the conveying device. For example, the conveying device can be positioned on the vehicle or construction equipment above the borehole to be filled. Another variant is that the conveying device is transported on the vehicle to the vicinity of the filling point, is unloaded from the vehicle there using a crane provided on the vehicle, for example, and is positioned above the borehole to be filled.

In one embodiment, a chain-driven transport vehicle is used. Optionally, the transport vehicle is able to drive on railway tracks or can be pulled by a drilling excavator.

A construction set is arranged on the means of transport, which makes it possible to move the push chain unit located on it in a swivelling and laterally extendable manner. The radius of action should preferably be up to 2 m around the centre point (around the X/Y axis). Such an attachment can be, for example, a swivelling cross table.

The drive of the present device is preferably hydraulic.

Furthermore, a receiving frame is provided on the transport means, which comprises the push chain unit with push chain and a vertical drive (Z-axis). The control of the Z-axis is harmonised with the swivelling movement of the X/Y-axis and is preferably carried out via a joystick.

The present conveying device is preferably attached to or connected with the receiving frame and can be arranged as a unit with the receiving frame either on the transport means (e.g. for the purpose of transport) or also used separately from the transport means (e.g. directly at the filling point).

The push chain unit can have a vertical height adjustment (along the Z-axis) up to 2 m above the top edge of the terrain. The height adjustment makes it possible for the pulled filling pipe to be easily turned down when the stuffing piston is at the upper stop.

Furthermore, the present conveying device has a device for positioning the stuffing piston above the filling tube. By means of a laser (green diode 575 nm, red diode 650 nm) the filling tube and the stuffing piston are controlled; with a positioning laser the stuffing piston is positioned above the filling tube.

Before the stuffing piston compresses the filling material by pressure, the filling pipe must be pulled out of the borehole by the height of the installed layer. The building material must not be compacted in the filling pipe. The push chain is suitable for pulling the filling pipe, as it is already in the filling pipe. Accordingly, according to a further embodiment, a device is provided for pulling the filling pipe out of the borehole depending on the backfilling of the borehole. This may be provided as a driver hook or braking device on the rigid push chain. These hooks or brakes connect to the filling pipe and allow the filling pipe to be pulled out of the borehole when the push chain is moving slowly.

A jaw gripper is used to pull the filling pipe out of the borehole. The jaw gripper grips the filling pipe to be pulled, pulls the filling pipe and turns the filling pipe off after pulling it out, e.g. at the screw thread.

In a further embodiment, the present device has a quick-change unit (as an excavator attachment). For this purpose, the receiving frame is connected to a rotation device, e.g. a tiltrotator. Such a tiltrotator enables a quick detachment of the receiving frame including the push chain unit from the transport means, and can be used as a mono device on the excavator.

In a further embodiment, the production device has a control technology for controlling the push chain drive. The control technology of the push chain drive measures the increasing counter pressure at the respective position of the stuffing piston in the borehole by means of a sensor (pressure sensor). In addition, the control technology controls a stuffing movement of the stuffing piston by means of a suitable back-and-forth movement and in this way compacts the cohesive earth material in the borehole.

In a further embodiment, the conveying device has an interface to the control technology via which electronic data on compaction, installed quantity and geoposition can be provided. This enables electronic quality documentation.

In one embodiment, the control technology that controls the push chain unit additionally provides the following data via a data interface:

Geolocation of the backfilled borehole via GPS coordinates, output in longitude and latitude, documented e.g. in the form of a QR code;

Date, time;

Compression level=position of the deepest borehole, given in m below top edge of terrain;

Groundwater level in the borehole, given in m below top edge of terrain;

Contact pressure during backfilling and compaction of the layer, given in Si unit, e.g. N/sqm;

Thickness of the compacted layer, given in m below top edge of terrain;

Further geophysically important measurement data through sensors, data such as water quality (salinity), Further numeric and alphanumeric data/free text by manual input at the terminal of the control unit A camera optionally installed in the stuffing piston provides photos that supplement the data set.

BRIEF DESCRIPTION OF THE DRAWINGS

The solution is explained in detail below by means of examples with reference to the figures.

DETAILED DESCRIPTION

Figure 1:
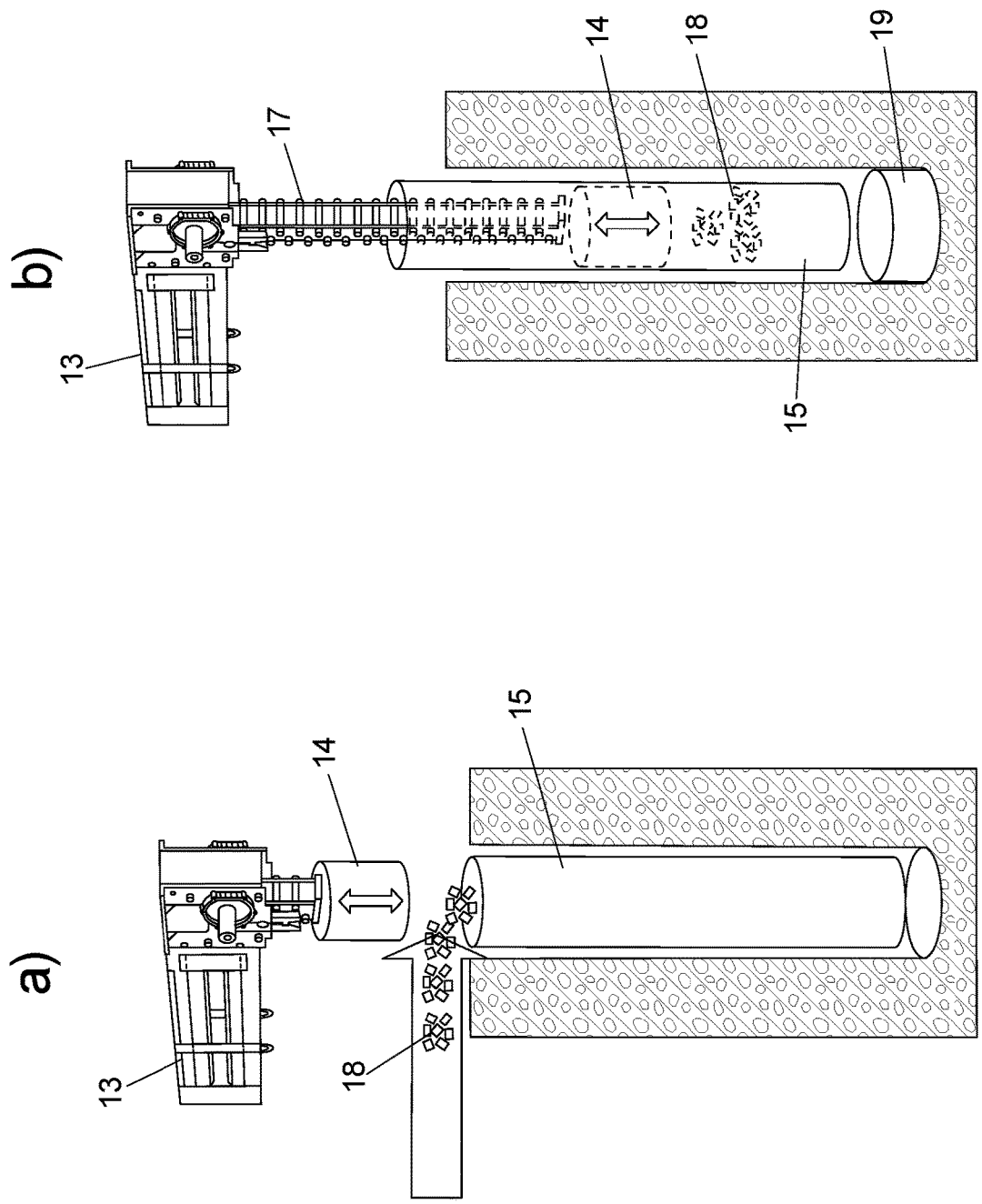
FIG. 1 shows a first schematic representation of the present method.

FIG. 1 shows the process steps for the first filling of a borehole. The cohesive building material 18 is produced in a shaft mixer or rotary mixer and filled in portions into the filling tube 15 or protective tube of the borehole (step a).

The stuffing piston 14, which is connected to the push chain 17 of the backfilling machine, pushes the building material through the filling pipe 15 to the bottom of the borehole. The push chain 17 is the drive unit of the machine, it pushes and pulls the stuffing piston 14. The filling pipe 15 is pulled out of the borehole as the backfilling progresses. A first layer of compacted backfill 19 is formed at the bottom (step b).

Figure 2:
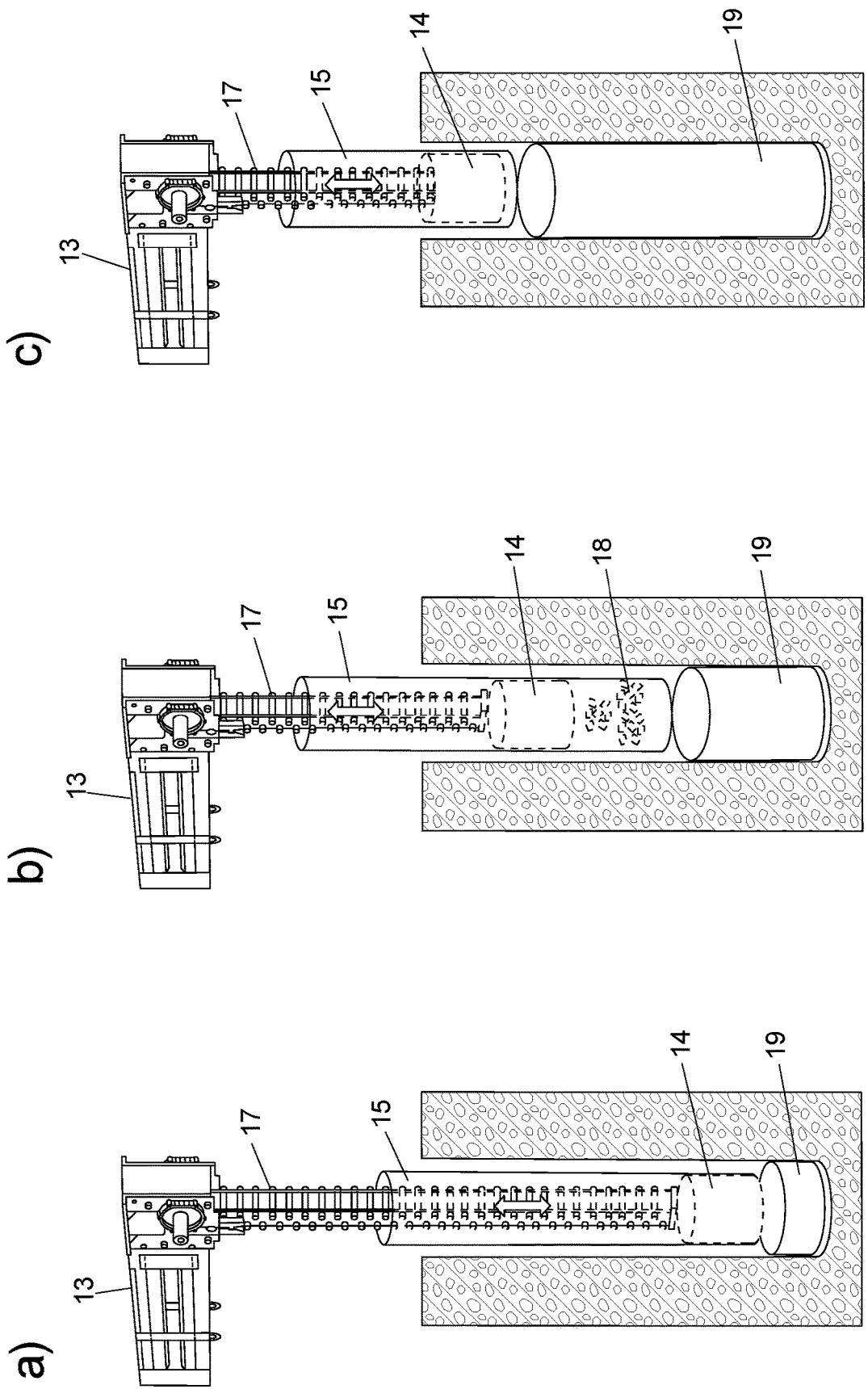
FIG. 2 shows a second schematic representation of the present method.

FIG. 2 shows the further steps a)-c), which lead to a layer-by-layer filling of the borehole and compaction of the cohesive building material in the borehole. The push chain 17 with the stuffing piston 14 is moved out of the filling tube 15, the filling tube 15 is filled with the next portion of sealing material 18, and the stuffing piston 14 is reinserted into the filling tube 15.

This process of filling in portions and compacting the cohesive building material 18 in the borehole is repeated until the borehole is completely filled and is flush with the ground surface or ground edge.

Figure 3:
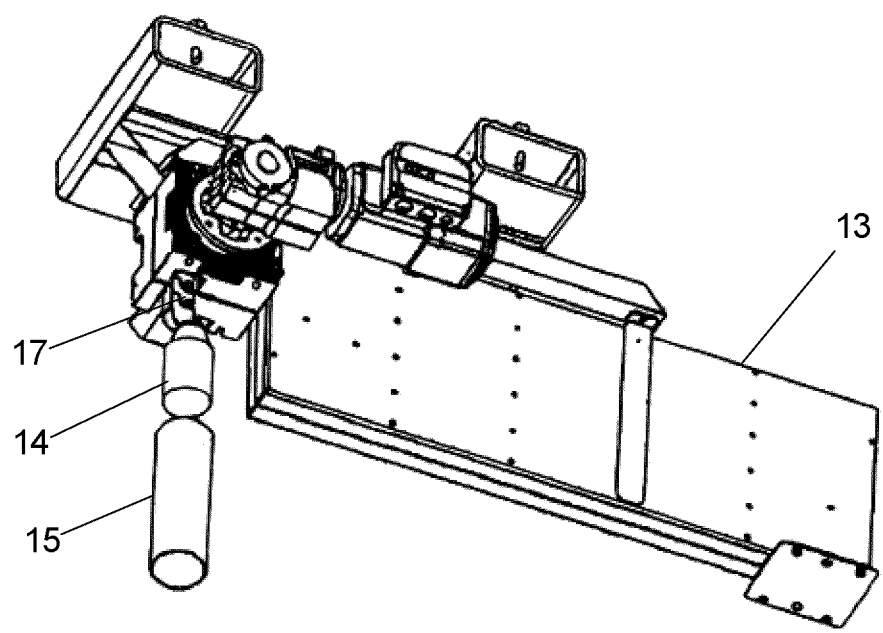
FIG. 3 shows a schematic representation of an embodiment of the push chain unit used in the present case.

FIG. 3 schematically shows an embodiment of the push chain unit 13 according to the solution. This push chain unit 13 comprises a push chain 17 with a push chain drive and a stuffing piston 14 driven by means of the push chain drive.

Figure 4:
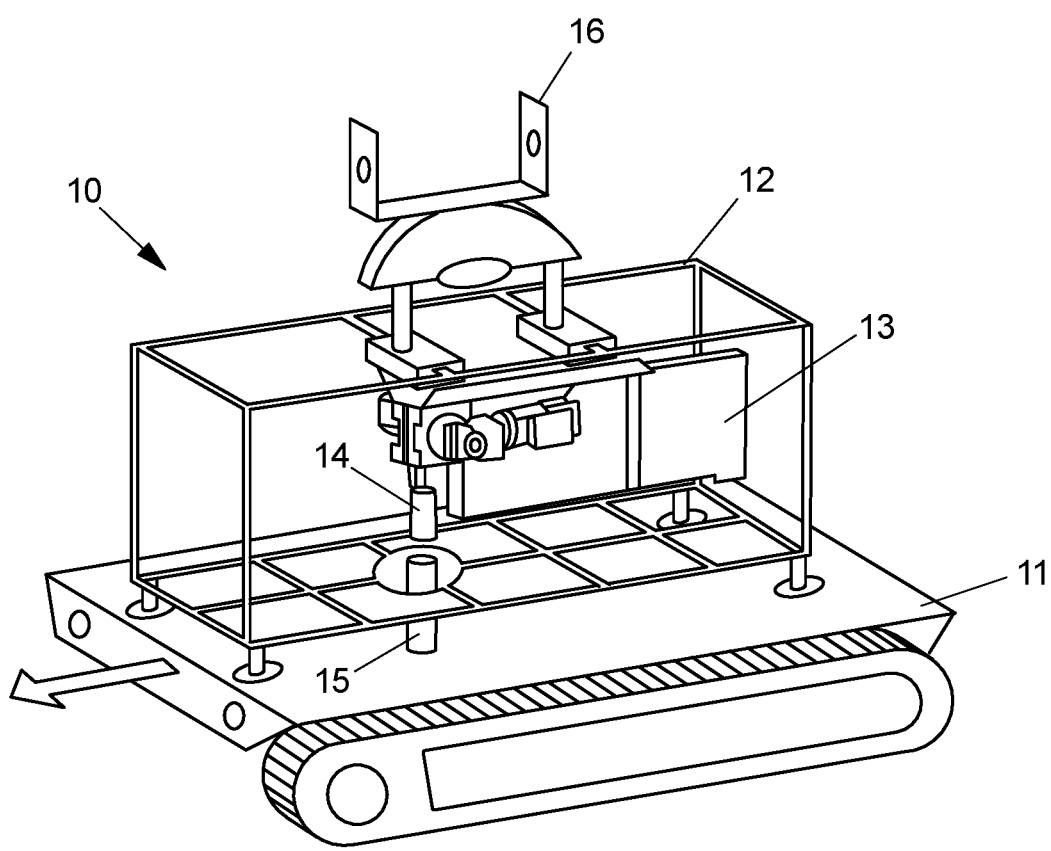
FIG. 4 shows a schematic representation of an embodiment of the present conveying device.

FIG. 4 schematically shows an embodiment of the filling device 10 according to the solution comprising the push chain unit 13 shown in FIG. 3 with stuffing piston 14 and filling tube 15.

The push chain unit 13 is part of a mounting frame which is arranged (horizontally) on a chain-driven transport means 11. For this purpose, a mounting kit (not shown) is arranged on the transport means, which makes it possible to move the push chain unit located on it in a swivelling and laterally extendable manner (along the X/Y axis).

The push chain unit can have a vertical height adjustment (along the Z-axis) up to 2 m above the top edge of the terrain. The height adjustment makes it possible for the pulled filling pipe 15 to be easily turned down when the stuffing piston 14 is at the upper stop.

The receiving frame 12 is connected to a rotation device 16, e.g. tiltrotator. Such a tiltrotator 16 enables a quick detachment of the receiving frame 12 including the push chain unit 13 from the transport means 11, so that an application as a mono unit on an excavator is possible.

Figure 5:
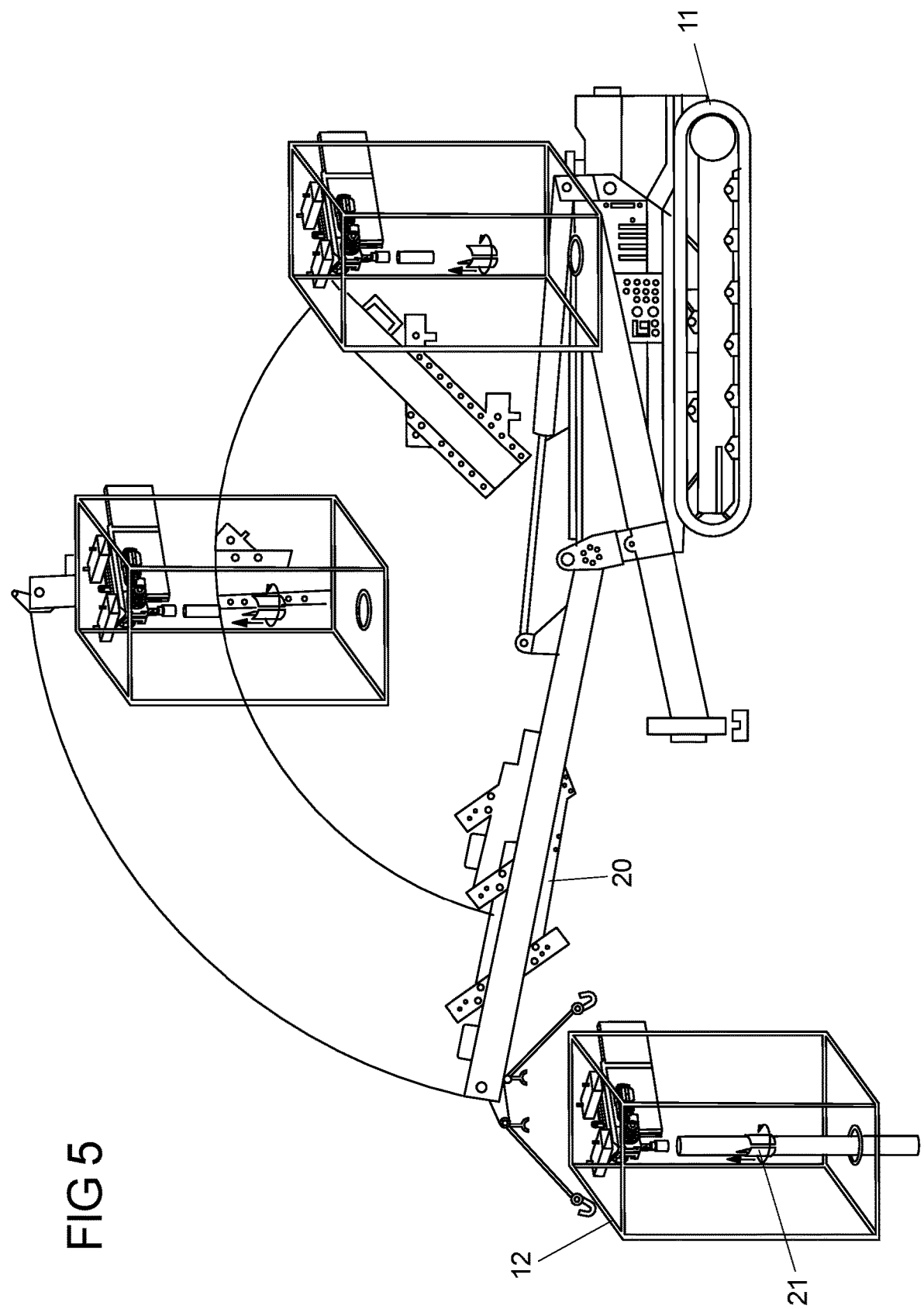
FIG. 5 shows a schematic representation of a further embodiment of the present conveying device.

FIG. 5 schematically shows a further embodiment of the filling device 10 according to the solution, comprising the push chain unit 13 shown in FIG. 4 with stuffing piston 14 and filling tube 15, which is connected to the receiving frame 12. In contrast to the embodiment in FIG. 5, the receiving frame 12 with the push chain unit 13 is arranged vertically on a piece of construction equipment as a means of transport 11.

The construction equipment shown in FIG. 5 also has a swivelling lifting device 20. This makes it possible to transport the conveying device on the construction equipment to the vicinity of the filling point, to position the conveying device comprising the receiving frame 12, the push chain unit 13 with the stuffing piston 14 and the filling pipe 15 above the borehole using the swivelling lifting device.

A jaw gripper 21 is used to pull the filling pipe out of the borehole. The jaw gripper 21 grips the filling pipe to be pulled, pulls the filling pipe and turns the filling pipe off after pulling it out, e.g. at the screw thread.

Example 1: Compaction Method for a Borehole from the Explosive Ordnance Sounding The explosive ordnance explorer drills boreholes of 100-130 mm diameter in a grid of approx. 1.20×1.20 m, usually 6 m deep. After drilling, the explorer inserts the exploratory protection tube into the borehole. The exploratory protection pipe is a PE or PVC pipe, usually 56 mm in diameter and 6 m long, which can also consist of screwed segments.

The explorer guides a magnetically sensitive measuring instrument on a cable into the protective pipe to the deepest point of the borehole. After the measurement is completed, the explorer leaves the borehole cased until the backfiller fills the borehole.

The all-terrain backfilling machine, driving on caterpillar tracks, is positioned above the borehole. The exploratory protection pipe, which was previously inserted into the borehole, has a slightly larger diameter of 94/104 mm (inside/outside) and consists of screwed-together segments, each 1.50 m long, and is filled with a quantity of sealing material that can be determined by means of a dozing technique (pouring chute, screw conveyor, slide gate or similar). The exploratory protection pipe becomes the filling pipe here.

The stuffing piston, which is attached to the push chain of the backfilling machine by means of a joint, is inserted into the filling pipe and driven with the push chain. This pushes the building material through the filling pipe until the deepest part of the borehole is reached. The control technology of the push chain drive measures the increasing counter pressure at the respective position of the stuffing piston by means of sensors (pressure sensor) and switches from "fast travel" to "slow travel=compaction". The control technology carries out a stuffing movement of the stuffing piston by suitable back-and-forth movement and in this way compacts the cohesive earth material.

As the layer-by-layer filling and compaction progresses, the filling pipe is pulled. This means: Compaction takes place outside (=below) the filling pipe, i.e. at the deepest point of the borehole.

The push chain with stuffing piston is moved out of the filling tube, the filling tube is filled with the next portion of sealant, the stuffing piston is reinserted into the filling tube.

Every calculated 3 layers, a segment of the filling pipe is unscrewed. With a pipe length of 6 m (corresponds to the borehole depth), this results in 12 trips of the push chain and layers of 50 cm backfilling distance and compaction each. At the end, the borehole is filled compacted layer by layer, 6 m borehole depth then has 12 compacted layers of 50 cm each.

Travel time of the push chain without compaction travel (assumption: travel down=same length as pulling time)

| | | Travel of push chain 25 cm/sec | | |
|---|---|---|---|---|
| No. | cm | Pushing time (sec) | Pulling time | Total time |
| 1 | 600 | 24 | 24 | 48 |
| 2 | 550 | 22 | 22 | 44 |
| 3 | 500 | 20 | 20 | 40 |
| 4 | 450 | 18 | 18 | 36 |
| 5 | 400 | 16 | 16 | 32 |
| 6 | 350 | 14 | 14 | 28 |
| 7 | 300 | 12 | 12 | 24 |
| 8 | 250 | 10 | 10 | 20 |
| 9 | 200 | 8 | 8 | 16 |
| 10 | 150 | 6 | 6 | 12 |
| 11 | 100 | 4 | 4 | 8 |
| 12 | 50 | 2 | 2 | 4 |
| | | | Total travel time (sec) | 312 |

The sum of the travel times of the push chain for a 6 m deep borehole and 12 layers takes around 300 seconds, i.e. around 6 minutes. This is quite plausible, the time budget for the entire backfilling is 15 minutes per borehole.

Example 2: Binding Building Material/Sealing Material

Recipe:
1 tonne of building material consists of:
60%=600 kg swellable clay (granulate grain size 1 . . . 16 mm, better 5 . . . 16 mm)
39.8%=398 litres of water
0.2%=2.0 kg hydrogel powder
The building material mixture should be prepared on site shortly before installation. Perhaps—but we have not yet tested this—the mixture can also be delivered ready-mixed (as with concrete in a truck mixer).
Manufacture:
Step 1: Place the hydrogel powder according to the solution in a stirred container/stirring machine/mixer in a quantity of 0.2% of the total quantity of building material.
Step 2: Add water approx. 40% in relation to the quantity of building material and mix/stir slowly (do not mix colloidally or disperse as with Ultraturrax!) until a no longer dripping, almost cut-resistant, slippery yet crumbly gel results.
Step 3: Add clay granulate corresponding to 60% of the total building material quantity and mix by stirring.
Result: The clay granules are irregularly surrounded by water-filled but solid particles (they look like shredded gummy bears). According to the solution, these water-gel particles release the water under pressure, thus the water gets into the swellable clay, which thus swells and becomes a dense, homogeneous clay mass.

The invention claimed is:

1. A method for layer-by-layer filling and compaction of cohesive building materials, in particular of cohesive soil building materials, in at least one borehole near a surface, the method comprising:
introducing the cohesive building material into the at least one borehole; and
compacting the cohesive building material layer-by-layer using a conveying device including a push chain drive and a stuffing piston driven by means of the push chain drive.

2. The method according to claim 1, wherein:
the at least one borehole is lined with a protective tube; and
the cohesive building material is filled into the protective tube in portions.

3. The method according to claim 2, wherein the protective tube is withdrawn from the borehole step by step during the filling of the borehole with the cohesive building material in dependence on the quantity of cohesive building material introduced.

4. The method according to claim 2, wherein the stuffing piston of the conveying device, after filling a first portion of the cohesive building material into the borehole:
pushes the cohesive building material through the protective tube to a bottom of the borehole; and
compacts the cohesive building material by a back-and-forth movement of the stuffing piston.

5. The method according to claim 1, wherein the stuffing piston of the conveying device, after filling a first portion of the cohesive building material into the borehole:
pushes the cohesive building material in the borehole to a bottom of the borehole; and
compacts the cohesive building material by a back-and-forth movement of the stuffing piston.

6. The method according to claim 1, wherein after compacting a first portion of the cohesive building material in the at least one borehole:
the stuffing piston is moved out of the borehole,
a further portion of the cohesive building material is filled into the borehole,
the stuffing piston is reintroduced into the borehole; and
the further portion of the cohesive building material is compacted by movement of the stuffing piston.

7. The method according to claim 1, wherein the cohesive building material for filling and compacting boreholes comprises:
at least one absorbent in the form of a hydrogel; and
compactable soil building material.

8. The method according to claim 7, wherein the compactable soil building material is selected from swellable clay minerals, excavated soil or excavated drilling material.

9. The method according to claim 7, wherein the compactable soil building material comprises swellable clay minerals, the method further comprising producing the cohesive building material, including:
producing the hydrogel from a crosslinked polyacrylate and water; and
adding a granulate of the swellable clay minerals to the hydrogel with mixing, whereby the granulate is wetted with the hydrogel.

10. The method according to claim 9, wherein the cohesive building material is producible from a mixture that contains:
approximately 60 wt. % of the swellable clay mineral;
approximately 0.2 wt. % of the hydrogel; and
approximately 39.8 wt. % of water.

11. The method according to claim 9, wherein the cohesive building material has a solid, crumbly consistency and a moisture content of 15% to 50% water content.

12. The method according to claim 7, wherein the hydrogel is an acrylic-based hydrogel.

13. The method according to claim 7, wherein the compactable soil building material is a swellable clay mineral selected from the group consisting of bentonite, montmorillonite, kaolinites, smectites, illites, chlorites and mixtures thereof.

* * * * *